(12) United States Patent
Rye et al.

(10) Patent No.: US 7,088,838 B2
(45) Date of Patent: Aug. 8, 2006

(54) SPEAKERPHONE ACCESSORY ASSEMBLY

(75) Inventors: Ryan P. Rye, Lawrenceville, GA (US); Martin H. Ramsden, Lawrenceville, GA (US)

(73) Assignee: Motorola, Inc., Schaumburg, IL (US)

( * ) Notice: Subject to any disclaimer, the term of this patent is extended or adjusted under 35 U.S.C. 154(b) by 246 days.

(21) Appl. No.: 10/411,809

(22) Filed: Apr. 11, 2003

(65) Prior Publication Data

US 2004/0202343 A1 Oct. 14, 2004

(51) Int. Cl.
*H04R 1/02* (2006.01)
*H05K 5/00* (2006.01)

(52) U.S. Cl. .................. 381/336; 381/345; 181/153

(58) Field of Classification Search .............. 381/386, 381/333, 336, 355, 359, 345, 353, 354, 392; 379/437, 429, 432, 433.01, 433.02, 440; 455/90.3, 550.1, 566, 575.1; 181/153, 148, 181/199

See application file for complete search history.

(56) References Cited

U.S. PATENT DOCUMENTS

| | | | |
|---|---|---|---|
| 4,385,209 A | * | 5/1983 | Greason et al. ............ 381/365 |
| 5,081,674 A | | 1/1992 | Wijas et al. |
| 5,201,069 A | * | 4/1993 | Barabolak ................. 379/429 |
| 5,513,259 A | * | 4/1996 | Pettit ..................... 379/433.02 |
| 5,682,290 A | | 10/1997 | Markow et al. |
| 6,081,421 A | | 6/2000 | Markow et al. |
| 6,526,150 B1 | | 2/2003 | Kelly et al. |

\* cited by examiner

*Primary Examiner*—Curtis Kuntz
*Assistant Examiner*—Brian Ensey
(74) *Attorney, Agent, or Firm*—Philip H. Burrus, IV

(57) ABSTRACT

An acoustic accessory is provided having a loudspeaker and a circuit board disposed therein. An acoustic suspension system is formed within the acoustic accessory by board retention rings disposed within the upper and lower housings of the accessory. The board suspension rings clench the printed circuit board, which includes at least one aperture. Rubber gaskets are coupled to the board retention rings to form an airtight seal. The air mass above the printed circuit board joins with the air mass below the printed circuit board to form a unitary reactance against which the loudspeaker works. The size and number of apertures may be varied in accordance with the acoustic application. Board retention posts optionally seat within notches in the printed circuit board to prevent the printed circuit board from moving laterally. Electrical connections may be made through the printed circuit board into the acoustic chamber, thereby not compromising the airtight seal.

11 Claims, 6 Drawing Sheets

SPEAKERPHONE ACCESSORY ASSEMBLY

BACKGROUND

1. Technical Field

This invention relates generally to loudspeaker accessories for portable electronic devices, and more particularly to speakerphone accessories for cellular telephones having improved low frequency response.

2. Background Art

One of the biggest problems that loudspeaker designers face is generating satisfactory low end, or bass, response. Specifically, the challenge is generating louder bass volumes (higher sound pressure level or "SPL") with smaller speakers without additional electronic amplification. Due to the low frequencies and long wavelengths of bass sounds, designers must pay special attention to the overall physical design of the loudspeaker housing, in addition to the selection of the loudspeaker itself. While one may generate treble easily by connecting a high frequency loudspeaker to a power amplifier, generating bass sounds is not so simple. One must consider not only the loudspeaker itself, but also the size, shape and construction of a low-frequency cabinet when designing for a proper bass response. To complicate matters further, the designer must take care to ensure volume levels are consistent across the audio spectrum (i.e, a "flat" response) so that resonances at higher frequencies do not cause "tinny" sounds.

If one simply connects a loudspeaker to an amplifier and tries to generate bass sounds by "pumping up the volume", several problems occur. First, turning the power of the amplifier up causes the loudspeaker cone to move further in and out, thereby straining the suspension material that ties the loudspeaker frame to the loudspeaker cone. Loudspeakers reproduce sound most accurately when the loudspeaker cone moves little relative to the frame. When the displacement of the cone becomes great relative to the frame, distortions appear in the reproduced sound.

Second, if the loudspeaker is just sitting in free space with no housing about it, the sound waves generated by the back of the cone may cancel those being produced by the front of the cone, thereby reducing the overall output. For example, many prior art low frequency speaker systems comprise a simple low frequency loudspeaker, or "woofer", with no enclosure, as in television and radio sets and some public address systems. The problem with these systems is that there is no way to prevent the radiation from the back of the speaker from canceling the radiation from the front. Thus, these systems require very large cone displacements at low frequencies.

One prior art approach for reducing back radiation is to place the loudspeaker driver in a closed box to form what is often called an "acoustic suspension system." In an acoustic suspension system, air trapped inside the closed box provides a reactance against which the loudspeaker cone works. The reactance limits the cone displacement and also prevents the radiation from the back of the loudspeaker from canceling that from the front. Any air leaks in the box will compromise the bass response, in that they both reduce the reactance and allow "cancellation sound" to escape from the box. A large volume within the closed box not only increases the SPL if the bass response, but additionally reduces resonances that may cause tinny sounds. As is known in the art, for any given design, a larger volume results in a lower Helmholtz resonant frequency, improving both bass SPL and overall frequency response provided the box is sealed in an airtight fashion.

The problem with prior art closed box solutions is that while they lend themselves well to large loudspeaker cabinets made from materials like wood, they are difficult to apply to small loudspeaker devices, like speakerphone accessories for cellular phones. Speakerphone accessories are generally small, and are made from materials like plastic that do not form airtight seals very well. Additionally, these accessories often include other circuitry, like charging circuitry for example, that must be coupled to the host electronic device by wires. Running wires through the walls of the accessory causes leaks, thereby compromising acoustic reproduction, especially the bass response.

There is thus a need for a speakerphone accessory with an improved low frequency response.

DETAILED DESCRIPTION OF THE INVENTION

Figure 1:
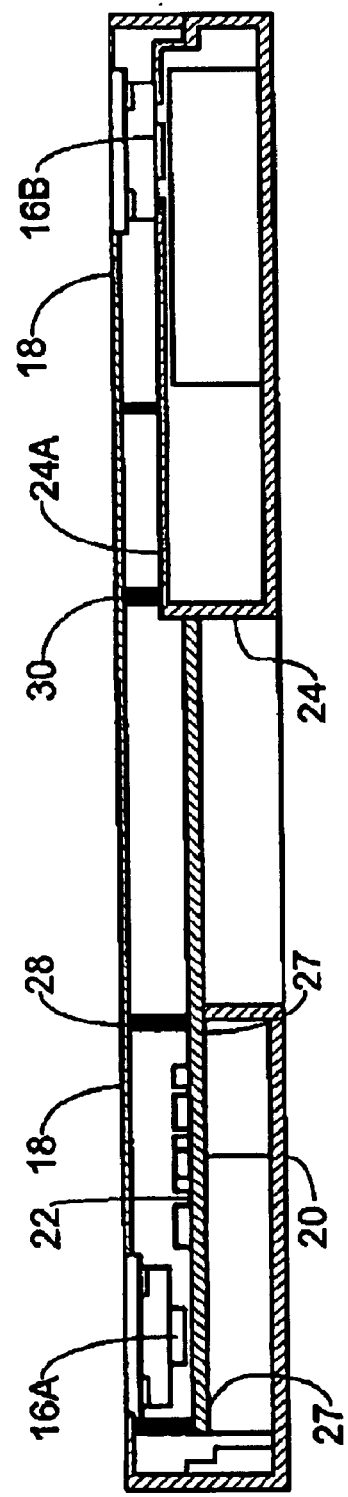
FIG. 1 illustrates a prior art speaker.

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on."

Air leaks in speakerphone housing assemblies are the primary cause of sub-optimal audio performance in speakerphone and car kit applications. Specifically, as noted above, with air leakage, low frequencies are suppressed and high frequencies tend to be over-emphasized due to the detrimental effect that the leaks have on the acoustic suspension system. Additionally, leaks can cause higher frequency resonances in the acoustic response that may cause the accessory to sound tinny or bright. However, cracks and leaks are part and parcel of most speakerphone designs because components like light emitting diodes, switches, and wires must pass through the outer assembly housing to reach the printed circuit board. These components pass through holes in the acoustic chamber, thereby creating leaks.

By way of background, U.S. Pat. No. 6,081,421, entitled "Portable Computer Having Loudspeakers in Enclosures Formed by Gaskets Located between a Keyboard, a Printed Circuit Board, and a Frame, issued to Markow et al. on Jun. 27, 2000, hereinafter "Markow", teaches a solution for forming a sealed, acoustic suspension system in a portable computer. Referring now to FIG. 1, illustrated therein is the solution of the Markow patent. The loudspeakers 16A and 16B are totally sealed in their respective radiation-controlling structure or total enclosure. An existing printed circuit board 22 is used as a rear enclosure solid wall. The keyboard cover 18, preferably formed from plastic, is used as the front enclosure solid wall. A gasket 28 is placed along a continuous track 27 of the printed circuit board 22 between the keyboard cover 18 and the printed circuit board 22 to form a total enclosure for the loudspeaker 16A.

Loudspeaker 16B is sealed by the existing structural member 24A, the keyboard cover 18 and gasket 30. As Markow states, "Likewise, by only the addition of the gasket 30, which is thinner than the gasket 28 because of the difference of height of the top surface of the structure 24A and the printed circuit board 22, used in combination with the existing keyboard section cover 18 and existing structural member 24A provides a total enclosure for loudspeaker 16B."

One object of the present invention is to provide a speaker phone accessory, that may be coupled to portable electronic devices like cellular phones, with an improved low end response. One problem with applying the Markow patent to the speakerphone accessory application is that the volume of air disposed between the keyboard cover 18, the gasket 28 (or 30) and the printed circuit board can be too small to provide acceptable reactance for the loudspeaker 16A. (According to the Helmholtz Resonator equation from acoustics, the resonant frequency of an enclosure is inversely proportional to the volume of the enclosure.) Additionally, the dimensions of the enclosure are limited by either the preexisting structure 24A or the printed circuit board 22, the keyboard cover 18 and the area surrounded by the gaskets 28,30. In other words, the invention of Markow is not tunable for various frequency responses.

Another problem with Markow is that tooling holes and vias present in the printed circuit board result in air leaks. The present invention offers an alternative to the Markow patent that may be employed in speakerphone applications to both seal the acoustic cavity and tune the low-end frequency response, especially in the conversational voice frequency range of 300 to 4000 Hz.

Figure 2:
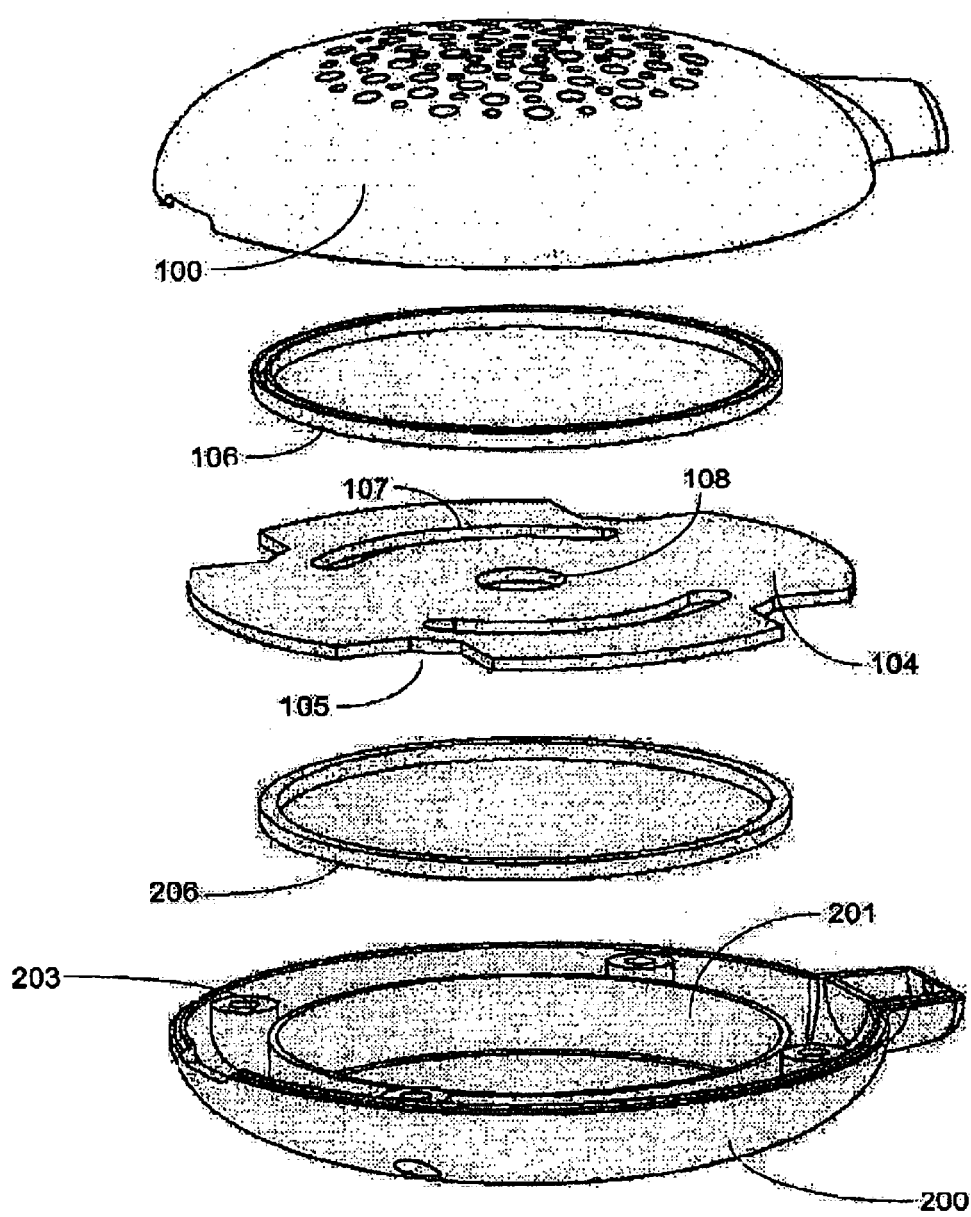
FIG. 2 is a top, left, rear, exploded isometric view of a speakerphone accessory in accordance with the invention.
Figure 3:
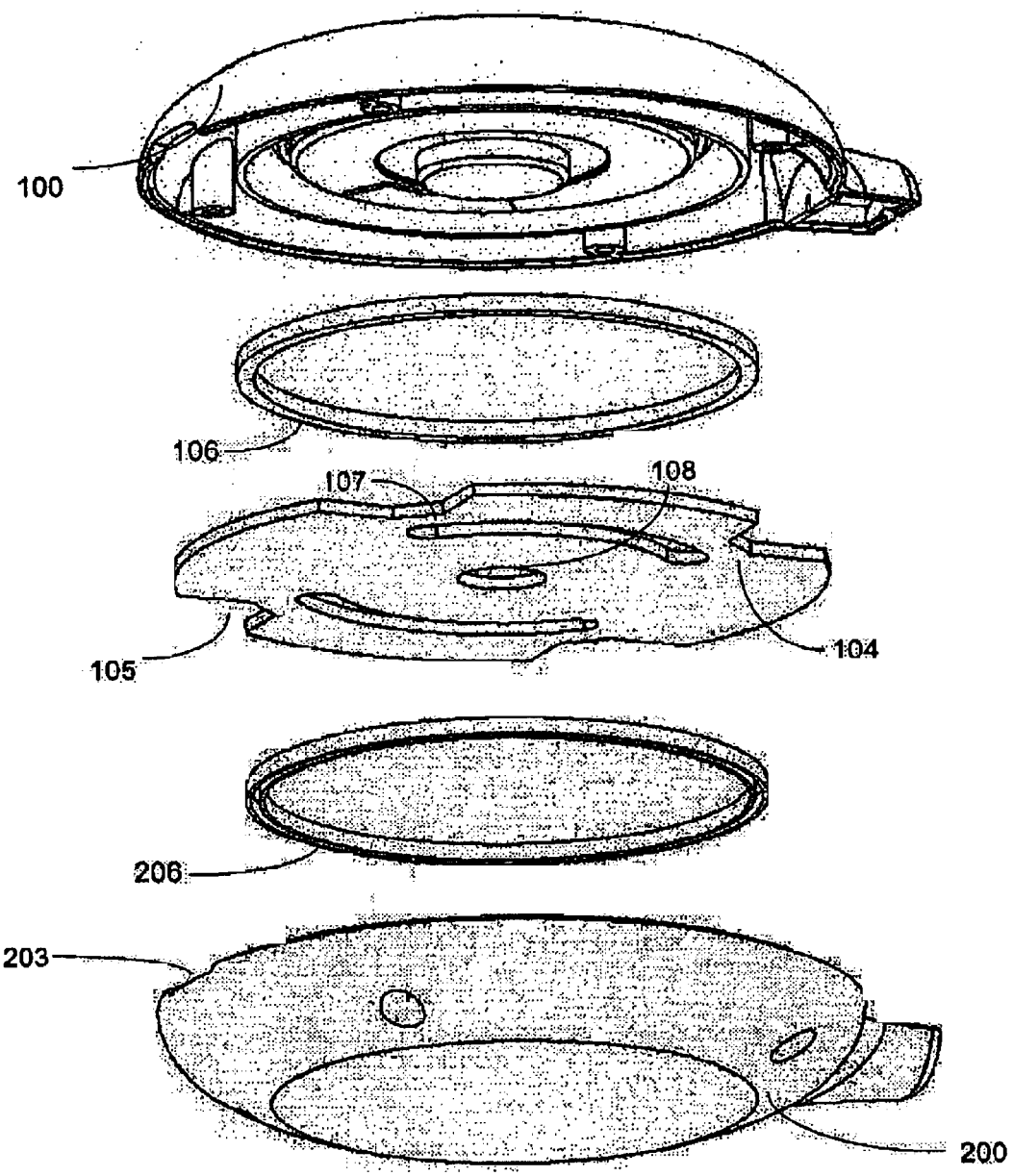
FIG. 3 is a bottom, left, rear, exploded isometric view of a speakerphone accessory in accordance with the invention.

Referring now to FIGS. 2 and 3, illustrated therein are preferred embodiments of a speakerphone accessory in accordance with the invention. FIG. 2 illustrates a top, left, rear, exploded isometric view, while FIG. 3 illustrates a bottom, left, rear, exploded isometric view of the same parts so that both the top and bottom of each part can be seen. The speakerphone comprises an upper housing 100 and a lower housing 200. The upper housing 100 has a loudspeaker 102 disposed therein. Both the upper housing 100 and lower housings 200 include board retention rings 101,201 and board retention bosses 103,203. The board retention rings 101,201 are vertical walls within the respective housings 100,200 that mechanically clench a printed circuit board 104 between the upper board retention ring 101 and the lower board retention ring 201 when the upper 100 and lower 200 housings are joined together.

At a minimum, the board retention rings 101,201 must surround the circumference of the loudspeaker 102. It will be clear to those of ordinary skill in the art that the design is not so limited, however. The board retention rings 101,201 may be any contour desired as long as they retain the printed circuit board 104 and form the airtight seal. Further, the board retention ring 101 of the top housing 100 does not have to be the same shape as the board retention ring 201 of the bottom housing 200. All that is required is that the board retention rings 101,201 and the printed circuit board 104 form an air-tight seal for the acoustic cavity. Thus, the design is flexible in that one, or both, of the board retention rings 101,201 may be contoured around larger, immovable components disposed on the printed circuit board 104. Board retention bosses 103,203 prevent the printed circuit board 104 from moving laterally, as the printed circuit board includes notches 105 that correspond to the board retention bosses 103,203.

Both the seal formed between the upper board retention ring 101 and the printed circuit board 104 and the seal between the lower board retention ring 201 and the printed circuit board 104 are made airtight by way of gaskets 106,206. The gaskets 106,206 are "U"-shaped when viewed in cross section, and seat about the edges of the upper and lower board retention rings 101,201. The gaskets are preferably manufactured from PORON® type urethane (PORON® referring to a flame retardant grade urethane sold by the Rogers Corporation of East Woodstock, Conn.). However, it will be apparent to those of ordinary skill in the art that other elastomer rubbers may be substituted.

The printed circuit board 104 includes at least one aperture 107 that allows the area between the printed circuit board 104 and the upper housing 100 to be joined with the area between the printed circuit board 104 and the lower housing 200 by way of the aperture 107. This joining creates a much larger air mass to act as a reactance against the loudspeaker 102. Additionally, the dimension and number of apertures may be varied to change the effective reactance of the joined air mass. Note that a hole 108 in the center of the printed circuit board 104 may optionally be used to align the loudspeaker 102 with the printed circuit board 104. Note that with the printed circuit board 104 board being "sandwiched" between the upper and lower board retention rings 101,201, any holes or vias in the printed circuit board 104 are not leaks. They simply couple the upper air mass to the lower air mass, thereby forming a single air reactance.

Figure 4:
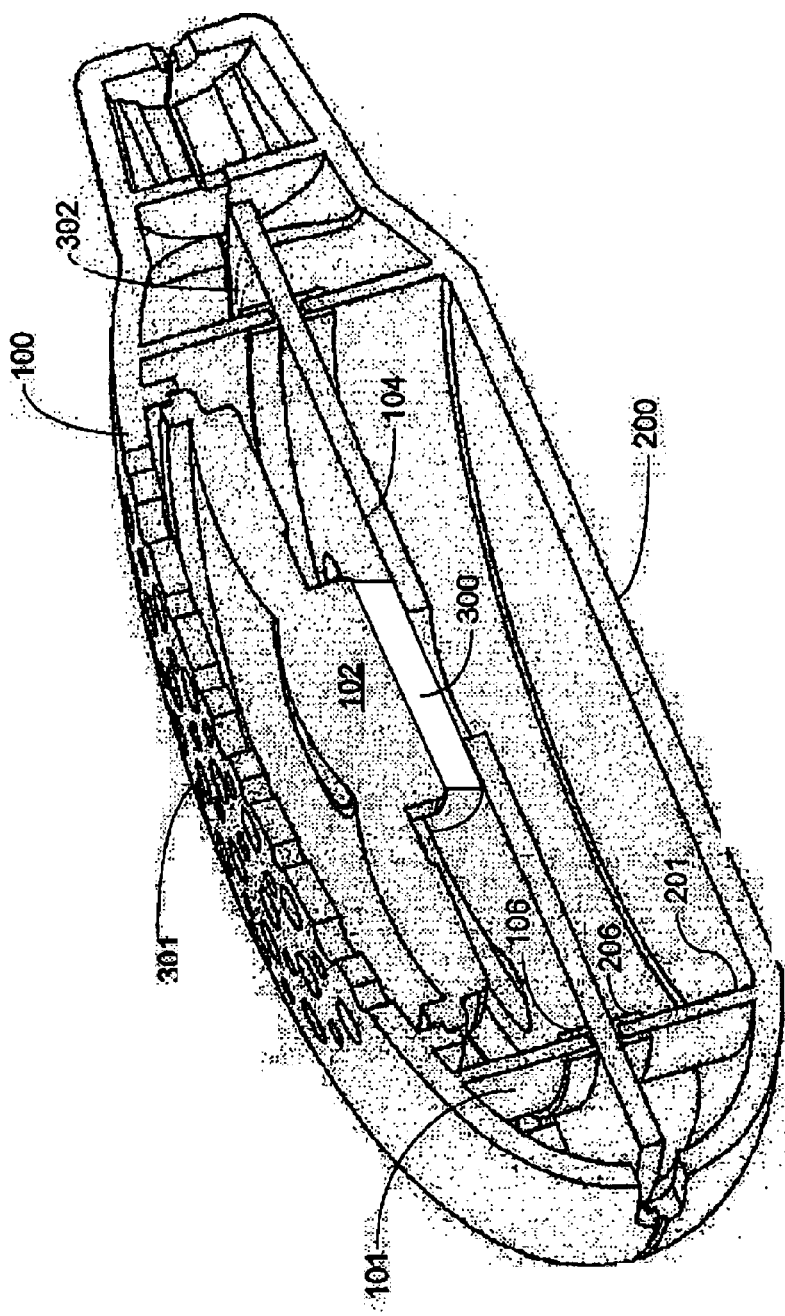
FIGS. 4 and 5 illustrate sectional views of an assembled speakerphone accessory in accordance with the invention.
Figure 5:
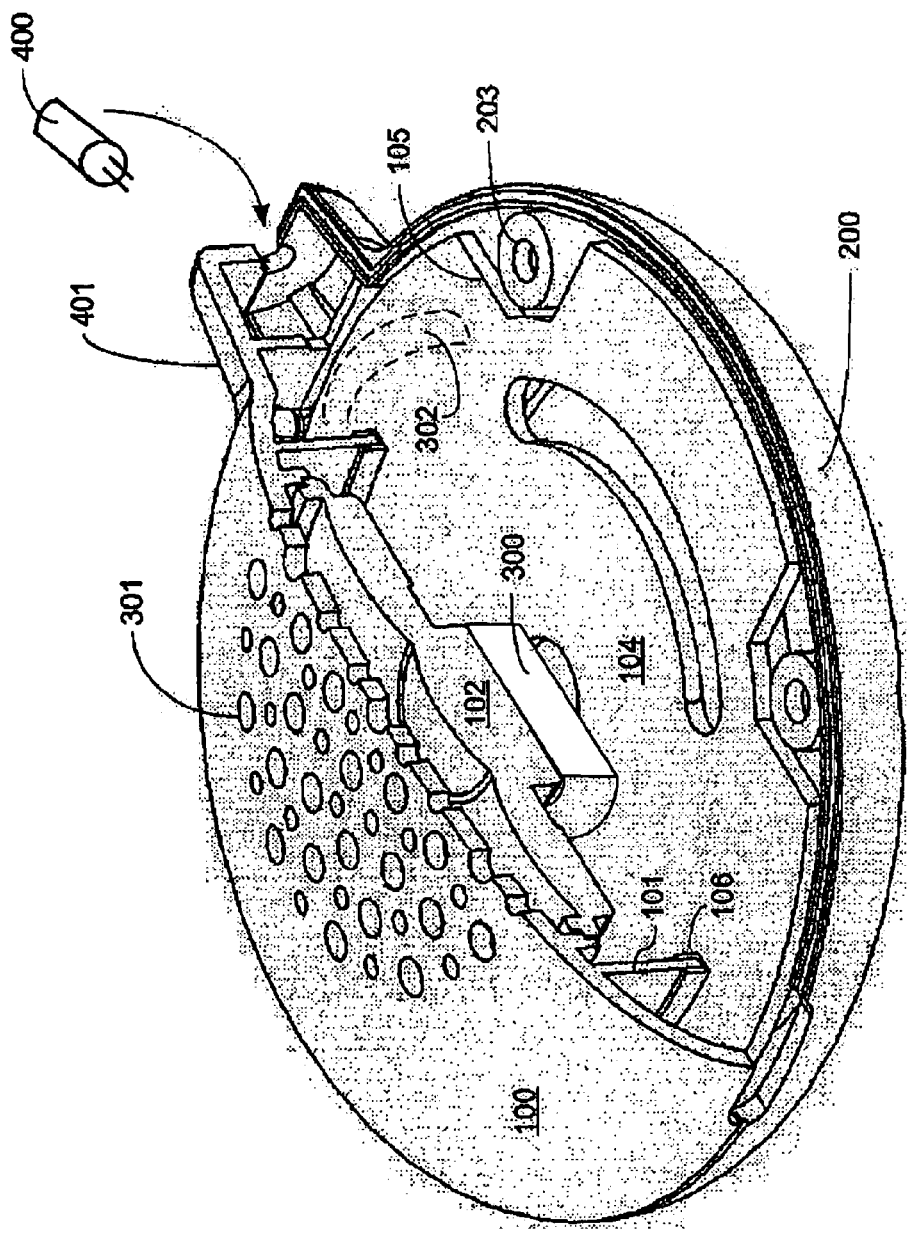

Referring now to FIGS. 4 and 5, illustrated therein are sectional views of an assembled speakerphone accessory in accordance with the invention. FIG. 4 is a sectional view of the entire accessory, while in FIG. 5, only the top half of the accessory has been sectioned. As shown, the upper housing 100 and lower housing 200 have been coupled together. This coupling is preferably accomplished by way of screws running through the board support posts 203, but may also be accomplished by glue, ultrasonic weld, snaps and the like.

An upper gasket 106 is placed on the upper board retention ring 101, and a lower gasket 206 is placed on the lower board retention ring 201. The printed circuit board 104 is sandwiched between the gasket covered retention rings 101,201 with enough force so as to form a virtually airtight seal between the upper and lower retention rings 101,201 and the printed circuit board. It will be clear to those of ordinary skill in the art that the thickness of the gasket may be varied depending upon the material selected and the forces holding the housings 100,200 together.

The thickness is dependent upon the "flatness" of the end of the retention rings 101,201. For example, taller retention rings 101,201 require more gasket material as the retention ring end planar "flatness" tolerance increases as well. In other words, if the upper retention ring 101 were, say 5 mm tall, then having at least 0.2 mm of excess material to be compressed would likely be sufficient. But, if the upper retention ring 101 were significantly larger, say 500 mm tall, then one would need more material to be compressed, as it would be difficult to control the end of the huge retention ring's "flatness" to within +/−0.20 mm (before you put the gasket on).

While there are many ways to mechanically couple the loudspeaker 102 to the upper housing 100, one preferred method is to place a compressible rubber or PORON® disc 300 between the printed circuit board 104 and the loudspeaker 102. In so doing, when the upper housing 100 is coupled to the lower housing 200, the loudspeaker 102 is firmly pressed against the upper housing 100, thereby creating a seal between the loudspeaker 102 and the upper housing. This compressible disc 300 against the back of the loudspeaker 102 also suppresses vibrations transmitted to the printed circuit board 104, thereby preventing rattle within the accessory.

Apertures 107 are included to couple the upper air mass to the lower air mass. As stated above, the size and placement of the apertures 107 may be varied to change the reactance of the total overall air mass. Apertures 301 are also provided in the upper housing 100 to permit sound to radiate through the upper housing 100. The board support posts 203 prevent lateral movement of the printed circuit board 104 by mating with the notches 105 in the printed circuit board 104.

By employing board retention rings 101,201, a portion 302 of the printed circuit board 104 is left outside the acoustic cavity. This portion 302 of the printed circuit board 104 is suitable for coupling light emitting diodes, switches, wires and the like, as they may be passed outside the accessory without penetrating the acoustic cavity. Copper traces disposed between the layers of the printed circuit board 104 form electrical connections between the outer portion 302 of the printed circuit board 104 and the acoustic cavity.

The dual retention ring structure has numerous advantages over the prior art. One of the biggest advantages is that most speakerphones include not only loudspeakers, but microphones as well. For example, referring again to FIG. 5, microphone 400 may either be coupled to the printed circuit board 104 outside the acoustic cavity, or may alternatively be placed in the protrusion 401 of the accessory. In either place, rattling caused by the loudspeaker 104 vibrating against either the housings 100,200 or the printed circuit board 104 are picked up by the microphone. However, with the dual retention ring 101,201 and gasket 106,206 structure, all vibrations are significantly dampened by the gaskets 106,206 and compressible member 300. Thus, the gaskets 106,206 provide structural isolation between the microphone 400 and the loudspeaker 102.

Figure 6:
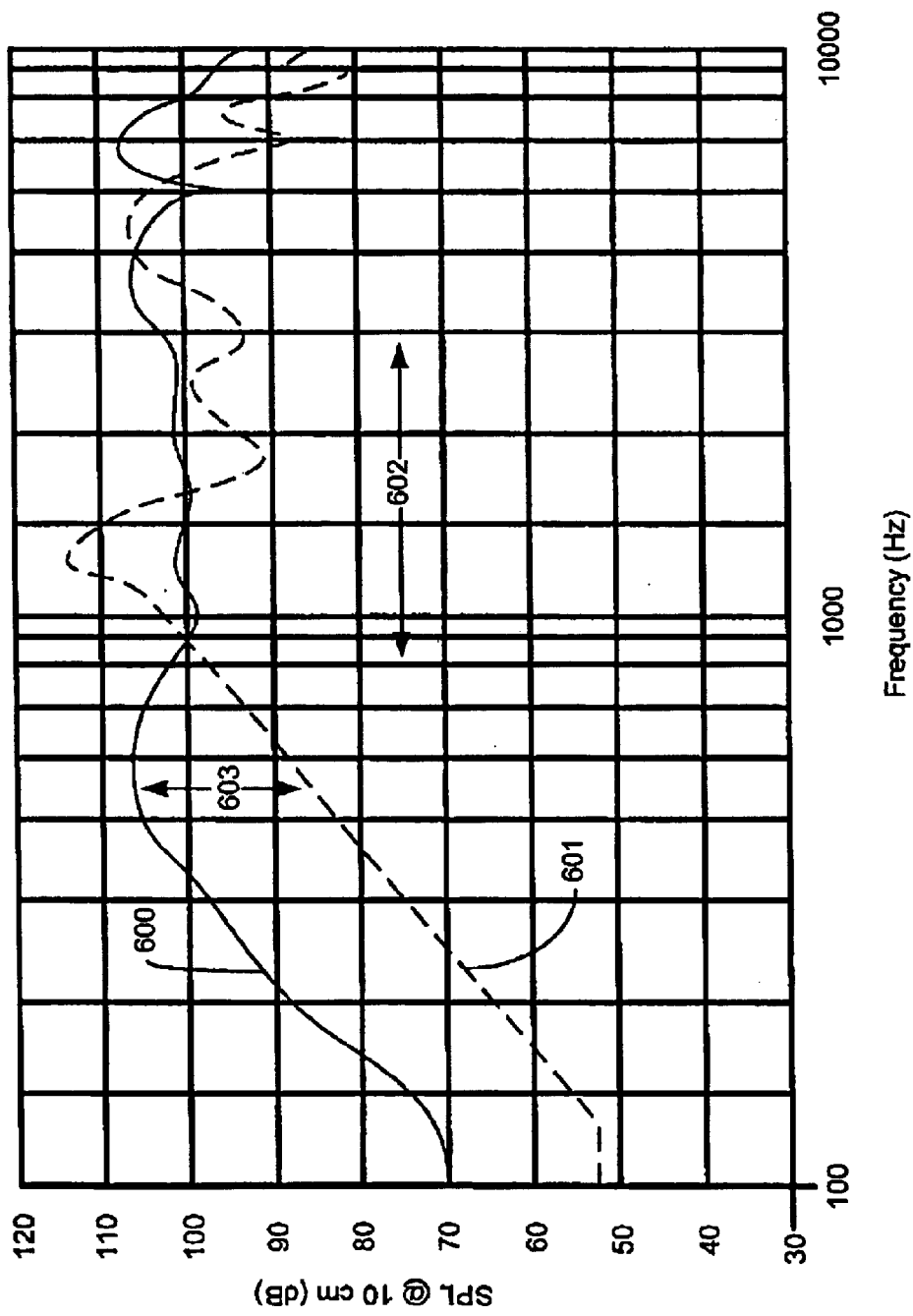
FIG. 6 illustrates a sound pressure level (SPL) plot of an accessory in accordance with the present invention and an accessory without retention rings and gaskets.

Next, the airtight seals and expanded reactance of the accessory offer greatly improved acoustical response. Referring now to FIG. 6, illustrated therein is a sound pressure level (SPL) plot. Line 600 is the SPL of an accessory in accordance with the invention, while line 601 is the SPL of an accessory without retention rings and gaskets. As can be seen by segment 603, there is an improvement of nearly 15 decibels (dB) at 500 Hz. Additionally, across the conversational frequency range, represented by segment 602, the overall response is much flatter than the prior art response.

Another advantage over the prior art is that the acoustic cavity volume is completely variable when using board retention rings. As the upper and lower housings are preferably manufactured from injection-molded plastic, the designer is free to alter the height and shape of the rings to vary the volume of the cavity. Further, as the board retention rings are rigid, they may be designed in non-circular shapes so as not to contact electrical components on the board. Additionally, the rigid rings eliminate the need for adhesives as required by Markow.

One other advantage is in the U-shaped gaskets. While the invention of Markow required a continuous track on the circuit board coated with adhesive, no such thing is required when using the board retention rings. The rigid nature of the rings, combined with the U-shaped gasket that "seats" on the rings, are all that is needed to ensure that the gasket does not move about on the printed circuit board. Fastening the upper and lower housings together provides the necessary compressive force to form an airtight seal.

While the preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims.

What is claimed is:

1. An acoustic accessory, comprising:
   a. an upper housing comprising at least one board retention ring;
   b. a lower housing comprising at least one board retention ring;
   c. a printed circuit board disposed between the at least one board retention ring of the upper housing and the at least one board retention ring of the lower housing;
   d. a loudspeaker; and
   e. at least two gaskets, wherein a first gasket is coupled to the at least one board retention ring of the upper housing, further wherein a second gasket is coupled to the at least one board retention ring of the lower housing.

2. The accessory of claim 1, wherein the printed circuit board comprises at least one aperture.

3. The accessory of claim 2, wherein the printed circuit board comprises at least one notch.

4. The accessory of claim 3, wherein the upper and lower housings comprise at least one board retention post.

5. The accessory of claim 4, wherein when the upper and lower housing are joined together, at least one board retention posts is disposed within the at least one notch.

6. The accessory of claim 5, wherein the upper and lower housing are joined together by at least one screw disposed within the at least one board retention post.

7. The accessory of claim 2, wherein the at least two gaskets have a U-shaped cross section.

8. The accessory of claim 7, wherein the at least two gaskets are manufactured from an elastomer rubber.

9. The accessory of claim 2, wherein the upper and lower housing are joined together by a fastener selected from the group consisting of screws, snaps, glue and ultrasonic welds.

10. The accessory of claim 2, further comprising a compressible rubber member disposed between the loudspeaker and the printed circuit board.

11. The accessory of claim 2, wherein the upper and lower housings are manufactured from injection molded plastic.

* * * * *